(12) United States Patent
Hussey et al.

(10) Patent No.: US 10,777,362 B2
(45) Date of Patent: Sep. 15, 2020

(54) METHOD TO REDUCE ANODE LEAD WIRE EMBRITTLEMENT IN CAPACITORS

(71) Applicant: KEMET Electronics Corporation, Fort Lauderdale, FL (US)

(72) Inventors: Steven C. Hussey, Simpsonville, SC (US); Yuri Freeman, Simpsonville, SC (US); Christian Guerrero, Simpsonville, SC (US); Chris Stolarski, Simpsonville, SC (US); Jeffrey N. Kelly, Simpsonville, SC (US); Philip M. Lessner, Simpsonville, SC (US); Siva Jyoth Lingala, Simpsonville, SC (US); Javaid Qazi, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 0 days.

(21) Appl. No.: 16/684,828

(22) Filed: Nov. 15, 2019

(65) Prior Publication Data
US 2020/0090875 A1   Mar. 19, 2020

Related U.S. Application Data

(62) Division of application No. 15/921,786, filed on Mar. 15, 2018.

(51) Int. Cl.
| | |
|---|---|
| *H01G 9/048* | (2006.01) |
| *H01G 9/012* | (2006.01) |
| *H01G 9/07* | (2006.01) |
| *H01G 9/00* | (2006.01) |
| *H01G 9/042* | (2006.01) |
| *H01G 9/15* | (2006.01) |
| *H01G 9/025* | (2006.01) |
| *H01G 9/032* | (2006.01) |

(52) U.S. Cl.
CPC .......... *H01G 9/048* (2013.01); *H01G 9/0032* (2013.01); *H01G 9/0036* (2013.01); *H01G 9/012* (2013.01); *H01G 9/042* (2013.01); *H01G 9/07* (2013.01); *H01G 9/032* (2013.01)

(58) Field of Classification Search
CPC ............ H01G 9/15; H01G 9/05; H01G 9/025; H01G 9/048; H01G 9/012; H01G 9/07; H01G 9/042; H01G 9/0032
USPC .......................... 361/523, 528, 529, 524, 538
See application file for complete search history.

(56) References Cited

U.S. PATENT DOCUMENTS

| | | | |
|---|---|---|---|
| 4,859,257 A * | 8/1989 | Bates .................. | C22C 27/02 148/422 |
| 8,349,030 B1 * | 1/2013 | Hussey ............... | H01G 9/0029 29/25.03 |
| 2010/0274307 A1 * | 10/2010 | Hintz .................. | A61N 1/05 607/5 |

(Continued)

Primary Examiner — Arun Ramaswamy
(74) Attorney, Agent, or Firm — Joseph T. Guy; Patent Filing Specialist, Inc.

(57) ABSTRACT

An improved capacitor, and method of manufacturing the improved capacitor, is provided. The method includes deoxygenating and leaching the anode wire to produce a capacitor comprising an anode having a surface area of at least 4.0 m²/g or a charge density of at least 200,000 CV/g with the anode wire having an equivalent diameter of less than 0.30 mm extending from said anode. A dielectric is on the anode and a cathode is on the dielectric.

29 Claims, 2 Drawing Sheets

(56) References Cited

U.S. PATENT DOCUMENTS

| | | | |
|---|---|---|---|
| 2014/0185190 A1* | 7/2014 | Haas | B22F 3/24 |
| | | | 361/500 |
| 2014/0268494 A1* | 9/2014 | Jones | B22F 9/04 |
| | | | 361/500 |
| 2016/0064150 A1* | 3/2016 | Haas | H01G 9/15 |
| | | | 419/27 |
| 2016/0284476 A1* | 9/2016 | Paulus | H01G 9/07 |

* cited by examiner

METHOD TO REDUCE ANODE LEAD WIRE EMBRITTLEMENT IN CAPACITORS

This application is a divisional application of pending U.S. patent application Ser. No. 15/921,786 filed Mar. 15, 2018, which is incorporated herein by reference.

FIELD OF THE INVENTION

The present invention is related to an improved solid electrolytic capacitor and method of making an improved solid electrolytic capacitor. More specifically, the present invention is related to a method of treating an anode wire and a sintered anode and wire for use in a solid electrolytic capacitor for improved robustness and increased volumetric efficiency.

BACKGROUND

An ongoing desire in the electronics industry is increased functionality in an ever-decreasing package size. This desire, referred to generally as miniaturization, has two primary points of focus with one being increasing the overall density of electronic components and the other being the size of the electronic components themselves. This particular invention is focused primarily on miniaturization of electronic components, specifically solid electrolytic electronic capacitors.

The contemporary capacitor market demands miniaturizing the overall capacitor case size while increasing the capacitance of the product and still maintaining the good electrical and mechanical performance parameters. To meet the demand, at the anode level, one of the approaches is to increase the charge of the powders used to form the anode while decreasing the diameter or thickness (for a flat wire) of the wire extending into the powder. While easily stated, the use of very small diameter or thickness anode wires has proven to be extremely difficult due to problems which were not previously recognized.

In practice, an anode wire is inserted into an anode powder and the anode powder is pressed into a monolith to form an anode precursor having the anode wire embedded therein and extending therefrom. The anode precursor is then sintered to form the anode. With very small anode wires the wire becomes very brittle after sintering and subsequent exposure to moisture or aqueous solutions, especially at the point of egress from the anode, leading to a very high loss rate due to anode wire breakage. The other factor that increases the wire brittleness is specific charge of the powder, CV/g. For the same diameter wire is more brittle in anodes sintered with higher CV/g powder. While not limited to theory, it is hypothesized that the wire is subjected to hydrogen evolving from the reaction of water (humidity) with tantalum in an incompletely passivated pellet. The hydrogen, as a byproduct of this reaction, diffuses into the tantalum wire making it brittle. The amount of hydrogen and, thereby, brittleness of the wire increases with the bulk concentration of oxygen in the wire [see Y. Freeman. *Tantalum Capacitors: Science, Technology, and Applications*, Springer, 2017]. With the increasing powder CV/g, more oxygen dissolves in the tantalum wire from the tantalum powder during the anode sintering, and thinner wire makes the bulk oxygen concentration higher.

The present invention provides a method of pretreating the anode wire, an improved anode wire and an improved capacitor wherein the anode wire is sufficiently ductile, even though very thin, thereby allowing for less anode volume being occupied by the anode wire thereby providing a higher capacitance as a function of anode volume.

SUMMARY OF THE INVENTION

The present invention is related to an improved solid electrolytic capacitor and, more specifically, a solid electrolytic capacitor with higher volumetric efficiency defined herein as capacitance as a function of anode volume.

More specifically, the present invention is related to an improved solid electrolytic capacitor comprising a more robust anode wire, thereby allowing for the use of anode wires with a smaller cross-sectional area, which minimizes the volume of the anode occupied by anode wire thereby allowing for more anode powder in a given anode volume.

A particular advantage of the invention is an improved manufacturing efficiency as the number of discarded parts, which are unusable due to anode wire failure, is significantly decreased.

These and other advantages, as will be realized, are provided in a capacitor comprising an anode having a surface area of at least 4.0 $m^2$/g or a charge density of at least 200,000 CV/g with an anode wire having an equivalent diameter of less than 0.30 mm extends from said anode. A dielectric is on the anode and a cathode is on the dielectric.

Yet another embodiment is provided in a method for forming a capacitor. The method comprises:
deoxygenating an anode wire to form a deoxygenated anode wire;
leaching the deoxygenated anode wire to form a deoxygenated and leached anode wire;
inserting the deoxygenated and leached anode wire into a valve metal powder;
pressing the valve metal powder into a monolith with the deoxygenated and leached anode wire embedded therein;
sintering the monolith to form an anode with the deoxygenated and leached anode wire extending from the anode;
forming a dielectric on the anode; and
forming a cathode on the dielectric.

DESCRIPTION

Figure 1:
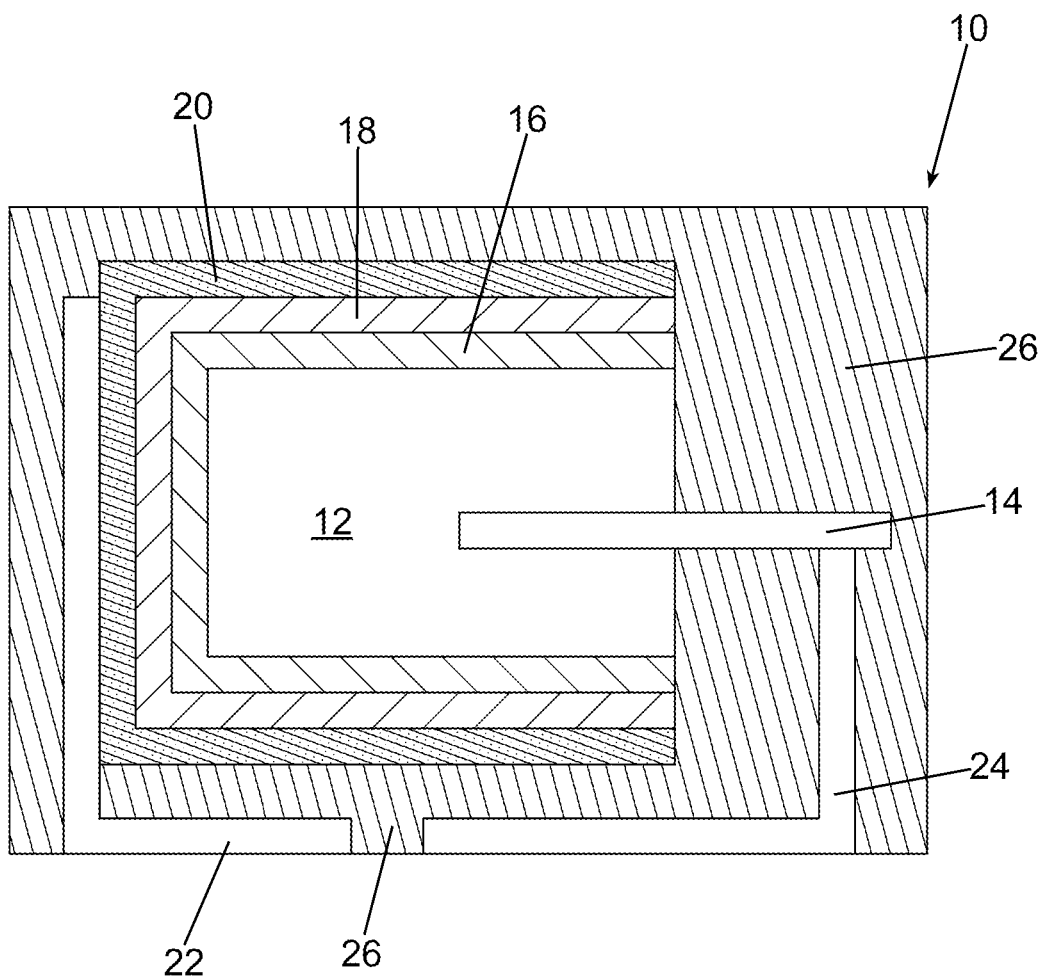
FIG. 1 is a schematic cross-sectional view of an embodiment of the invention.

The present invention is related to an improved solid electrolytic capacitor and, more specifically, an improved solid electrolytic capacitor wherein the bond between the anode wire and anode is improved and the anode wire is rendered less brittle by prior treatment of the anode wire.

The problems associated with anode wire brittleness are mitigated by deoxidation of the anode wire prior to formation of the anode thereby allowing for the use of thin anode wires. A thinner anode wire increases the amount of anode powder in a given volume and proportionally increases the volumetric efficiency of the capacitors.

In the present invention the anode wire is subjected to a deoxidation, and acid leach, prior to incorporation of the anode wire into the anode powder. Deoxidation is accomplished by the use of a reducing agent having a higher oxygen affinity than the valve metal of the anode wire. Preferred reducing agents include alkali metals, alkaline earth metals or aluminum. Calcium, magnesium and aluminum are preferred with magnesium being most preferred.

The invention allows for the use of very thin anode wires and high surface area or high charge capacity powders. The combination of very thin anode wires and high surface area, or high charge capacity, powders was previously not available due to the aforementioned brittleness of the anode wire after sintering and subsequent exposure to moisture or aqueous solutions.

The present invention allows for the use of anode powders with an equivalent surface area, based on tantalum, to achieve a high charge capacitance. The surface area, for tantalum is at least 4.0 $m^2/g$ measured in accordance with Brunauer-Emmett-Teller (BET) measurement techniques. A surface area of at least 4.0 $m^2/g$, for tantalum powder, represents a charge density of at least 200,000 CV/g. More preferably the powder has a surface area of at least 5.0 $m^2/g$ represents a tantalum powder having a charge density of 250,000 CV/g. Still more preferably the powder has a surface area of at least 6.0 $m^2/g$ represents a tantalum powder having a charge density of 300,000 CV/g.

The high surface area powder can be used with anode wires, which are preferably round, having an equivalent diameter of no more than 0.30 mm wherein equivalent diameter is the diameter a circle having the same cross-sectional area. It is more preferable that the anode wire have an equivalent cross-sectional area of a round wire with no more than 0.20 mm equivalent diameter. More preferably that the anode wire have an equivalent cross-sectional area of a round wire with no more than 0.10 mm equivalent diameter.

The wire micro-hardness of the Tantalum wire was measured using the Vickers method, typically using a load of 100 g for 10 seconds, using a Leco LM-100AT microhardness system. The anode wire has a preferred micro-hardness of at least 150 $kgf/mm^2$ to support anode pressing. More preferably, the anode wire has a micro-hardness of at least 200 $kgf/mm^2$ but still ductile. Below a micro-hardness of about 120 $kgf/mm^2$ the wire is insufficient to support anode pressing and the wire tends to jam due to deformation on the press and it is difficult to feed the wire into the press cavity reliably. Representative micro-hardness is presented in Table 1. Therefore, a doped wire is preferred particularly to retain sufficient micro hardness after deoxidation when a deoxygenated tantalum wire process is used. Prior to the instant invention a high charge powder having a high surface area, used in combination with an anode wire having a small cross-sectional area, resulted in brittle anode wire, after subsequent exposure to moisture or aqueous solutions, which was not suitable for use in manufacturing due to excess part failure.

TABLE 1

Ta wire micro-hardness

| | Hardness ($kgf/mm^2$) | |
|---|---|---|
| | As received | After Mg Deoxidation |
| Un-doped Ta Wire | 275 | 115 (unable to press) |
| Doped Ta Wire | 345 | 220 |

The invention will be described with reference to the figures forming an integral, non-limiting, component of the instant application. Throughout the specification similar elements will be numbered accordingly.

An embodiment of the invention will be described with reference to FIG. 1 wherein a solid electrolytic capacitor is illustrated in cross-sectional schematic view. In FIG. 1, the capacitor, generally represented at 10, comprises an anode, 12, as described elsewhere herein. A deoxidized anode wire, 14, is embedded in the anode and extends from the anode wherein the wire is preferably a tantalum wire and more preferably a doped tantalum wire as will be discussed elsewhere herein. A dielectric, 16, is on the surface of the anode wherein the preferred dielectric is an oxide of the valve metal of the anode. A cathode layer, 18, is on the surface of the dielectric. A particularly preferred cathode layer is a conductive polymer with conductive thiophenes being most preferred. Transition layers, 20, are preferably on the surface of the cathode layer wherein the transition layers preferably include carbon containing layers and metal containing layers and allow for electrical connectivity between the cathode and a cathode external termination, 22. An anode external termination, 24, is in electrical contact with the anode wire. It is preferred that the entire cathode, except for a portion of the cathode external termination and a portion of the anode external termination, be encased in an encapsulant, 26, as known in the art.

Figure 2:
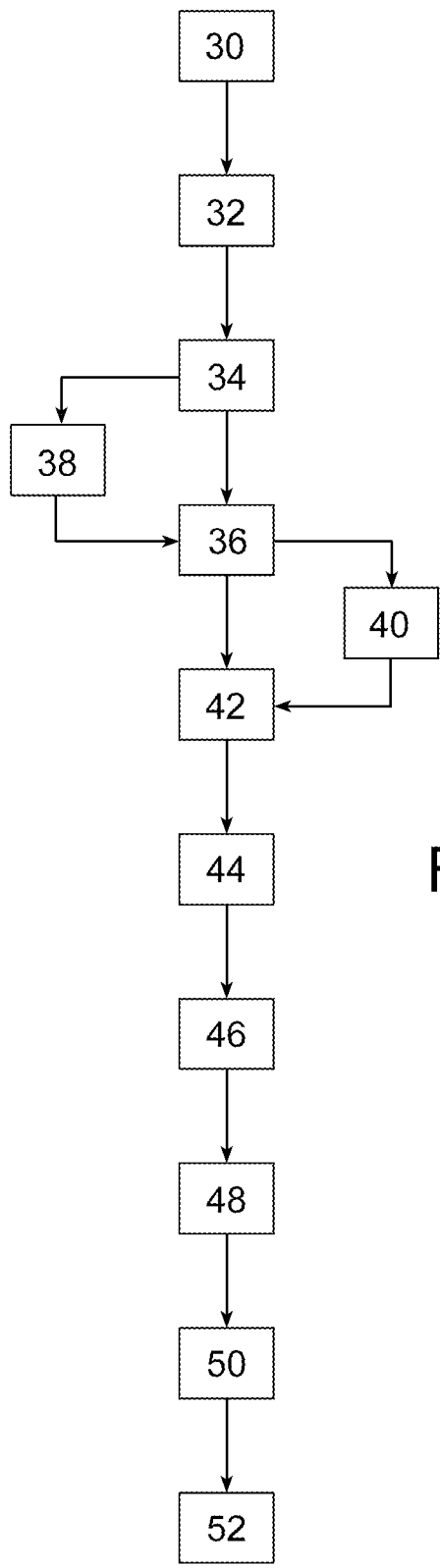
FIG. 2 is a schematic flow-chart representation of an embodiment of the invention.

The process for forming the solid electrolytic capacitor will be described relative to FIG. 2 wherein a flow-chart representation of the method is provided. In FIG. 2, an anode wire is deoxidized at 30 and acid leached at 32 with optional passivation. The anode wire is deoxidized by reaction with a reducing agent, preferably magnesium, in a deoxidizing furnace at temperatures above the melting point of the reducing agent and typically in the preferred range of 900° C. to 1100° C.

In the deoxidation process the anode wire is loaded into a vacuum furnace with an appropriate amount of Mg. The furnace is heated to a temperature sufficient to vaporize the Mg and the temperature is maintained until available oxygen is interacted with Mg and form MgO. In an exemplary embodiment about 6 gms of Mg is sufficient to deoxidize about 453 to 680 g of Ta material in about 3 hrs at about 1000° C. The material is then leached to remove MgO residue from the wire.

The leaching process completes the formation of the native dielectric layer while removing any hydrogen produced thereby preventing hydrogen embrittlement. This also removes the MgO in the deoxidized Ta materials. Leaching can be accomplished in an aqueous mineral acid. A particularly suitable wash solution for removing MgO is a dilute aqueous solution of sulfuric acid and hydrogen peroxide.

In the leaching process deoxidized wires are dipped into leach solution such as a mixture of hydrogen peroxide and sulfuric acid in a concentration sufficient to leach the magnesium oxide in the desired time. As would be realized to those of skill in the art a wide range of hydrogen peroxide and sulfuric acid can be used with more highly concentrated solutions being more rapid. By way of example, without limit thereto, an aqueous solution comprising about 11.3 vol % of $H_2O_2$, 35% concentrated, and 4.7 vol % $H_2SO_4$, 98% concentrated, is mixed with 84 vol % deionized DI water and held for about 4 hours. In some embodiments, more aggressive leach solutions such as 50 Vol % $HNO_3$, 68% concentrated, and 50 vol % of deonized water can be used. The leached parts are then washed thoroughly and dried in an oven preferably at about 85° C. until the parts are dry. A second leaching can be performed if desired.

A valve metal powder is provided at 34 and pressed into pellets at 36 with the anode wire in the powder during pressing. It is optional, but preferable, to add a lubricant or binder to the powder at 38. A lubricant or binder used during pressing improves the density uniformity through the pellet and prevents die wear-out.

If a lubricant or binder is used the lubricant or binder is removed at 40 by heating in vacuum, or by washing in aqueous detergents.

The pressed anodes undergo sintering, at 42, in vacuum in a sintering furnace at sintering temperatures equal or slightly lower than conventionally used sintering temperatures. Sintering temperatures are preferably about 1,100° C. to about 1,800° C. and typically about 1,250° C.

Valve metals, and particularly tantalum, has a high affinity for oxygen and therefore a sudden exposure of post sintered high surface area tantalum anodes to oxygen will result in bulk tantalum oxides which are detrimental to electrical properties. This may also result in thermal oxidation of Ta, leading to partial native oxide formation and possible runaway oxidation. Subsequent exposure to moisture, water or electrolyte can result in hydrogen embrittlement of the Ta wire. It is preferred to utilize controlled exposure of the sintered anode to oxygen over time thereby limiting the tantalum oxide formation to the surface. This technique is referred to herein as "passivation" or "progressive step passivation".

Passivation is performed, at 44, preferably immediately after sintering in a vacuum furnace and cooling to a lower temperature than the sintering temperature preferably with initial introduction of less than the stoichiometric amount of oxygen necessary to form native oxide. Formation of the native oxide is exothermic and therefore the amount of oxygen added in each aliquot during passivation is below that amount necessary to raise the temperature of the anode to 60° C. and more preferably, the amount of oxygen in each aliquot is no more than that amount necessary to raise the temperature of the anode to 50° C. As would be realized the amount of oxygen in each aliquot is partially dependent on the temperature prior to the addition of the aliquot with ambient, or near ambient, being preferred for manufacturing efficiency. With each aliquot added the temperature rise as a function of oxygen added decreases and therefore the amount of oxygen can increase per aliquot as the number of aliquots increases. The anodes can be cooled, such as by flowing an inert gas over the anode, between aliquots if desired.

In passivation the amount of oxygen required to stoichiometrically form the native valve metal oxide layer is a function of surface area and is determinate. Typical native surface oxide for Ta is equivalent to a dielectric layer formed at 1.167V wherein about 18 angstroms of oxide is formed per volt. Using the surface area of the sintered anode, the total mass of stoichiometric oxygen needed can be calculated, using tantalum for the purposes of discussion, by the following equation:

Weight of O (g)/Weight of Ta (g)=BET (m$^2$/g of Ta)×10$^4$ (cm$^2$/m$^2$)×1.167V×18 U/V×10$^{-8}$ (cm/Å)×8.2 (density of Ta$_2$O$_5$ g/cm$^3$)×0.182 (g O/g Ta$_2$O$_5$)×10$^6$ μg O/g O; and dividing this result by BET, which is the surface area, yields the optimum ratio of O (ppm)/BET of 3100 (μg O/m$^2$) or about 0.31 μg/cm$^2$.

Passivation is accomplished using dry air as a medium to provide the required oxygen. The amount of air volume is calculated at standard temperature and pressure (STP) in terms of cubic centimeters at STP (SCC), or Torr, where STP is 25° C. and 1 atmosphere. Passivation is preferably carried out in multiple steps at a temperature no exceeding 60° C. wherein a portion of the total oxygen necessary to achieve stoichiometric native oxygen is introduced at each step. More preferably the passivation temperature does not exceed 50° C. By way of non-limiting example; 10% of the required air volume could be provided in a first step, 20% in a second step, 30% in a third step and the final 40% in a fourth step and therefore by the end of passivation cycle, which is four steps in this example, 100% of the required oxygen is provided. Each step can be followed by a hold time sufficient to allow the temperature to decrease to the extent necessary to insure a subsequent aliquot of oxygen does not allow the temperature to rise above 60° C. and more preferably not above 50° C. The number of steps in the passivation schedule is not particularly limited, it can vary anywhere from 2 steps to 100 steps with air volume % ranging from 1% to 99% in each step. In some instances, more than a stoichiometric amount of oxygen is added to increase the surface oxide layer with the proviso that the temperature does not exceed the maximum temperature for passivation. It is preferable that no more than 250% of the calculated stoichiometric oxygen be introduced during passivation.

After passivation in air, it is desirable to further passivate the anode. It is advantageous to use the same sulfuric acid-hydrogen peroxide solution used in leaching to complete the passivation of the anode and wire.

It is preferable to incorporate the anode into a capacitor. Returning to FIG. 2, the anode is anodized at 46 to form a dielectric on the surface wherein the dielectric is preferably an oxide of the valve metal. Anodization is well known in the art and the method of anodizing is not particularly limited herein. Other dielectrics could be incorporated without departing from the scope of the invention but oxides of the anode are widely used in the art.

A cathode layer is formed on the dielectric at 48. The cathode is a conductive layer and may be formed from conductive polymers, such as conductive thiophenes with polyethylenedioxythiophene being exemplary for use in the demonstration of the invention. Other cathode layers, such as manganese dioxide which is a conductive semiconductor, are suitable for use in demonstration of the invention.

It is widely understood that external terminations are difficult to form on the cathode, particularly with a conductive polymeric cathode, and transition layers are typically applied to the cathode layer at 50 to facilitate termination. In particular, carbon layers overcoated with metal layers, such as silver or nickel, are suitable for demonstration of the invention. The capacitor is typically finished at 52. Finishing may include attachment of external terminations, encapsulating in an insulator, testing, packaging and the like.

The anode preferably comprises a valve metal and most preferable niobium or tantalum due to the advantages provided by the use of magnesium as a reducing agent with these valve metals. Tantalum is most preferred as the anode material.

The anode wire preferably comprises a valve metal and most preferable niobium or tantalum due to the advantages provided by the use of magnesium as a reducing agent with these valve metals. Other valve metals can be used with the proviso that a reducing agent having a higher oxygen affinity than the valve metal will be required. Tantalum is preferred as the anode and most preferably doped tantalum is preferred. It is preferable that the tantalum of the anode wire be doped. Particularly suitable dopants include Yttrium (Y), Silicon (Si), Cerium (Ce), Carbon (C), Germanium (Ge), Palladium (Pd), Platinum (Pt), Rhenium (Rh), Molybdenum (Mo), Lanthanum (La), Neodymium (Nd), Thallium (Th) and others.

EXAMPLES

The wire micro-hardness as measured by the Vickers method, typically using a load of 100 g for 10 seconds, using a Leco LM-100AT microhardness system.

The bend test procedure is used to measure the number of bends the wire can withstand before breaking. For the bend test, the wire is bent 90 degrees at a prescribed distance from the top of the anode. This is counted as 0.5 bends. Then the wire is bent back to the original position and counted as a total of 1.0 bends. Then the wire is bent in the opposite direction at the same distance from the top of the anode to 90 degrees and counted as a total of 1.5 bends. Then the wire is bent back to the original position and counted as a total of 2.0 bends. This process is repeated until the wire breaks. The number of bends recorded for the sample is the last total number of bends before breaking. The typical bend test is performed at least 1.0 mm from the top of the anode. In addition, the wire at the egress is the most affected and thus will have the least number of bends. Therefore, a bend test conducted at the egress of the anode will be critical to gauge wire ductility and suitability for capacitor manufacturing.

Example 1

A series of anodes were pressed using 250,000 CV/g Ta powder with an 0.15 mm (0.0059 inch) diameter Ta anode wire. The anode wire extended approximately 7.6 mm (0.30 inches) beyond the point of egress from the anode and approximately 80% of anode length into the anode body. Three wires were utilized with the first one being a control (designated "C") which was a commercially available Ta wire with no doping and no treatment prior to anode formation. The second wire was the same as the control except it was deoxygenated with magnesium and acid leach (designated "CM"). The third wire has the same dimension but the wire was a commercially available tantalum wire doped with yttrium and silicon and deoxygenated with magnesium and acid leach (designated "CDM"). The anodes are pressed using these three different wires followed by conventional treating to remove lubricant, sinter the anode and acid leach. The bend test was executed at the egress of the anode wire from the anode body (0 mm) and at a position which was 1.5 mm from the point of egress. The bend tests were executed after pressing and sintering. Furthermore, some examples were tested post sintering (PS) but prior to leaching and some being tested after sintering and leaching (PL). All anodes were exposed to deionized water for 24 hours prior to bend testing wherein the 24 hours water soak was used to mimic the subsequent electro-chemical processes. The results are provided in Table 2 wherein the "Bends" represents the average number of bends before the wire severed at the bend.

TABLE 2

| Anode Wire | Position | PS Bends | PL Bends |
|---|---|---|---|
| C | 0 mm | 0.20 | 0.75 |
| C | 1.5 mm | 6.5 | 11.4 |
| CM | 0 mm | 0.30 | 3.60 |
| CM | 1.5 mm | 8.80 | 13.10 |
| CDM | 0 mm | 0.40 | 4.90 |
| CDM | 1.5 mm | 10.00 | 13.40 |

The results of Table 2 illustrate the advantages of deoxidation of the anode wire wherein a 50% improvement in the number of bends is realized due to deoxidation and 100% improvement is realized, relative to the control, with doped wires when the number of bends prior to breaking is measured at the point of egress which is a worst case scenario. Deoxygenating the anode wire and leaching the sintered anode provides a significant improvement with the number of bends increasing by 480% for the deoxygenated anode wire, relative to the control and 653% for the anode wherein the anode wire was deoxygenated and the anode was leached, relative to the control, when measured at the point of egress.

Example 2

An anode was formed as in Example 1 except that the anodes were passivated in a five-step passivation process at a passivation temperature (PT) of either 50° C. or 30° C. Some of the anodes were exposed to deionized water for 24 hours wherein the 24 hours water soak was used to mimic the subsequent electro-chemical processes. The temperature (° C.) of each step, the percent of total calculated oxygen (% O) introduced at each step for a total of 250% of the calculated oxygen required, the volume of air (SCC) and soak time (Min) are provided in Table 3.

TABLE 3

| Step | ° C. | % O | SCC | Min |
|---|---|---|---|---|
| 1 | 54 | 10 | 121.36 | 10 |
| 2 | 52 | 20 | 242.72 | 1.4 |
| 3 | 51 | 40 | 485.43 | 0.4 |
| 4 | 50 | 80 | 970.87 | 0 |
| 5 | 51 | 100 | 1213.58 | 5 |

The samples of Example 2 were subjected to a bend test at the point of egress. The Results are provided in Table 4.

TABLE 4

| Anode Wire | PT | PS Bends No Soak | PS Bends Soak | PL Treatment Bends No Soak | PL Treatment Bends Soak |
|---|---|---|---|---|---|
| C | 50° C. | 6.60 | 0.50 | 7.80 | 2.70 |
| CD | 50° C. | 8.07 | 0.50 | 7.60 | 5.28 |
| CDM | 50° C. | 8.25 | 0.60 | 8.20 | 5.64 |
| C | 30° C. | 6.00 | 0.50 | 3.37 | 0.66 |
| CD | 30° C. | 7.30 | 0.50 | 5.16 | 3.50 |
| CDM | 30° C. | 7.10 | 0.500 | 6.60 | 4.87 |

The results presented in Table 4 illustrate the significant increase in anode wire robustness, based on the number of bends required to break the anode wire, and especially the improved robustness at the egress of the anode body that can be achieved by passivation at temperatures above ambient.

The invention has been described with reference to the preferred embodiments without limit thereto. Those of skill in the art would realize additional alterations and improvements which are within the scope of the claimed invention as more specifically set forth in the claims appended hereto.

The invention claimed is:

1. A method for forming a capacitor comprising:
   deoxygenating an anode wire to form a deoxygenated anode wire;
   leaching said deoxygenated anode wire to form a deoxygenated and leached anode wire;
   inserting said deoxygenated and leached anode wire into a valve metal powder;

pressing said valve metal powder into a monolith with said deoxygenated and leached anode wire embedded therein;

sintering said monolith to form an anode with said deoxygenated and leached anode wire extending from said anode;

forming a dielectric on said anode;

forming a cathode on said dielectric; and further comprising passivating said anode after said sintering and prior to said forming of said dielectric wherein said passivating comprises introducing said anode to a first aliquot of oxygen comprising less than a stoichiometric amount of oxygen necessary to form a native dielectric.

2. The method for forming a capacitor of claim 1 wherein said deoxygenated and leached anode wire comprises tantalum.

3. The method for forming a capacitor of claim 2 wherein said deoxygenated and leached anode wire further comprises a dopant.

4. The method for forming a capacitor of claim 3 wherein said dopant is selected from the group consisting of yttrium, silicon, cerium, carbon, germanium, palladium, platinum, rhenium, molybdenum, lanthanum, neodymium and thallium.

5. The method for forming a capacitor of claim 1 wherein said anode wire has an equivalent diameter of no more than 0.30 mm.

6. The method for forming a capacitor of claim 5 wherein said anode wire has an equivalent diameter of no more than 0.20 mm.

7. The method for forming a capacitor of claim 6 wherein said anode wire has an equivalent diameter of no more than 0.10 mm.

8. The method for forming a capacitor of claim 1 wherein said anode comprises a valve metal.

9. The method for forming a capacitor of claim 8 wherein said valve metal is selected from the group consisting of niobium and tantalum.

10. The method for forming a capacitor of claim 9 wherein said valve metal is tantalum.

11. The method for forming a capacitor of claim 1 wherein said cathode comprises a material selected from manganese dioxide and a conductive polymer.

12. The method for forming a capacitor of claim 11 wherein said conductive polymer is a thiophene.

13. The method for forming a capacitor of claim 12 wherein said thiophene comprises polyethylenedioxythiophene.

14. The method for forming a capacitor of claim 1 wherein said passivating further comprises introducing said anode to a second aliquot of said oxygen.

15. The method for forming a capacitor of claim 1 wherein said passivating is at a temperature of no more than 60° C.

16. The method for forming a capacitor of claim 15 wherein said passivating is at a temperature of no more than 50° C.

17. The method for forming a capacitor of claim 1 further comprising leaching of said anode after said sintering and prior to said forming of said dielectric.

18. The method for forming a capacitor of claim 1 wherein said sintering is at a temperature of at least 1,100° C. to no more than 1,800° C.

19. The method for forming a capacitor of claim 1 wherein said valve metal powder has a surface area of at least 4.0 m$^2$/g.

20. The method for forming a capacitor of claim 19 wherein said valve metal powder has a surface area of at least 200,000 m$^2$/g.

21. The method for forming a capacitor of claim 1 wherein said valve metal powder has a charge density of at least 250,000 CV/g.

22. The method for forming a capacitor of claim 21 wherein said valve metal powder has a charge density of at least 300,000 CV/g.

23. The method for forming a capacitor of claim 1 wherein said deoxygenating of said anode wire comprises heating said anode wire in the presence of a reducing agent having a higher affinity for oxygen than said anode wire.

24. The method for forming a capacitor of claim 23 wherein said reducing agent is selected from the group consisting of alkali metals, alkaline earth metals and aluminum.

25. The method for forming a capacitor of claim 24 wherein said reducing agent magnesium.

26. The method for forming a capacitor of claim 1 wherein said leaching comprises treating said deoxygenated anode wire with an aqueous solution comprising at least one of hydrogen peroxide or an acid.

27. The method for forming a capacitor of claim 1 further comprising forming a transition layer on said cathode.

28. The method for forming a capacitor of claim 1 further comprising attaching cathode external termination to said cathode in electrical contact with said cathode and attaching an anode external termination to said anode in electrical contact with said anode.

29. The method for forming a capacitor of claim 1 further comprising encapsulating at least a portion of said capacitor.

* * * * *